M. BENKOVICS.
BRAKE SHOE MECHANISM.
APPLICATION FILED AUG. 4, 1914.

1,123,468.

Patented Jan. 5, 1915.
2 SHEETS—SHEET 1.

M. BENKOVICS.
BRAKE SHOE MECHANISM.
APPLICATION FILED AUG. 4, 1914.

1,123,468.

Patented Jan. 5, 1915.
2 SHEETS—SHEET 2.

Witnesses
G. M. Copenhaver
J. K. Bryant

Inventor
M. Benkovics
By A. M. Wilson
Attorney

UNITED STATES PATENT OFFICE.

MAREK BENKOVICS, OF JOHNSTOWN, NEW YORK.

BRAKE-SHOE MECHANISM.

1,123,468.  Specification of Letters Patent.  Patented Jan. 5, 1915.

Application filed August 4, 1914. Serial No. 854,987.

*To all whom it may concern:*

Be it known that I, MAREK BENKOVICS, a subject of the Emperor of Austria-Hungary, residing at Johnstown, in the county of Fulton and State of New York, have invented certain new and useful Improvements in Brake-Shoe Mechanism, of which the following is a specification.

This invention relates to new and useful improvements in brake shoe mechanism.

The primary object of the invention is to provide brake shoes suspended in an advance of the car wheels and adapted for lowering into braking position upon the track rails when released for such movements.

A further object is to provide brake shoes at each end of a car operable by levers extending to operative positions upon the car, and in which the brake shoes are adapted to be brought beneath and removed from the adjacent car wheels.

A still further object is to provide swinging arms upon a car operable by a hand lever and having suspended thereon a pair of brake shoes adapted to be released to drop by their own weight into proper braking positions upon the rails and in advance of the adjacent wheels.

While the objects herein set forth are the most important, it will nevertheless be understood that further objects will appear and that the invention consists in the arrangement of parts hereinafter fully described, illustrated in the accompanying drawings, and pointed out in the appended claims.

Figure 1:
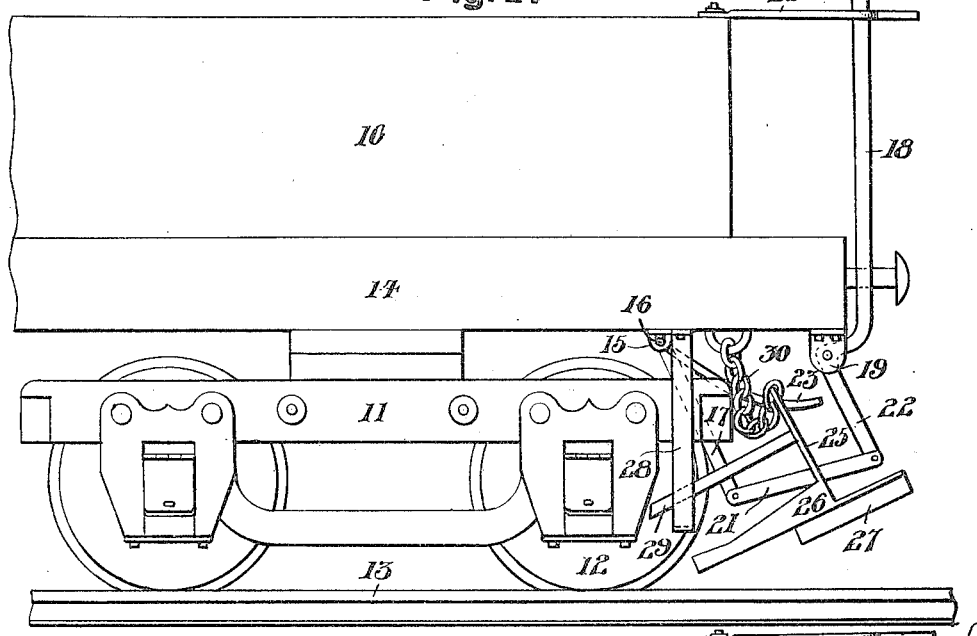
Figure 2:
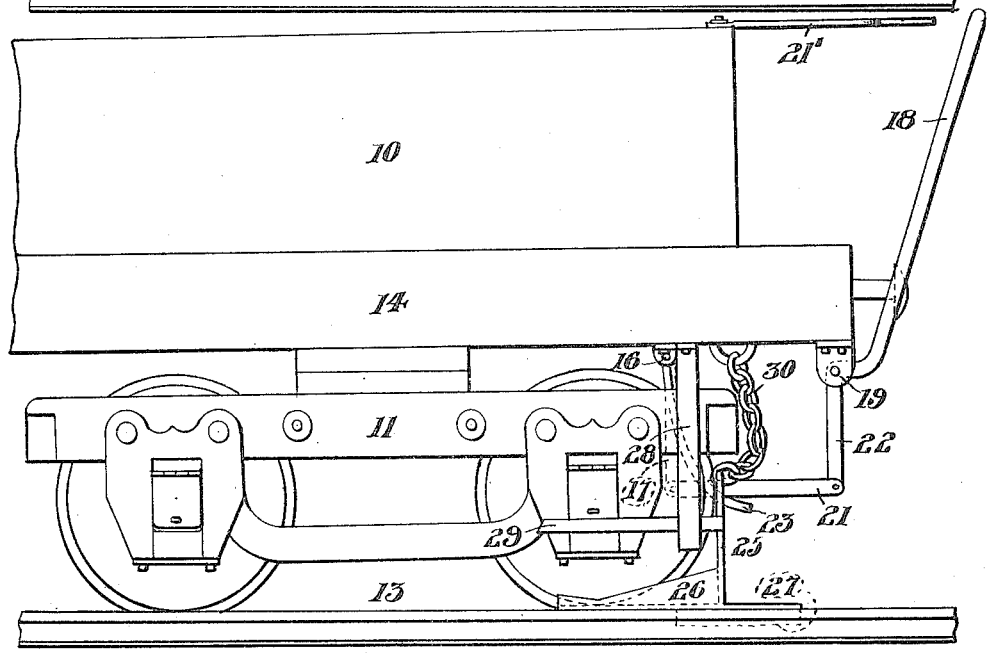
Figure 3:
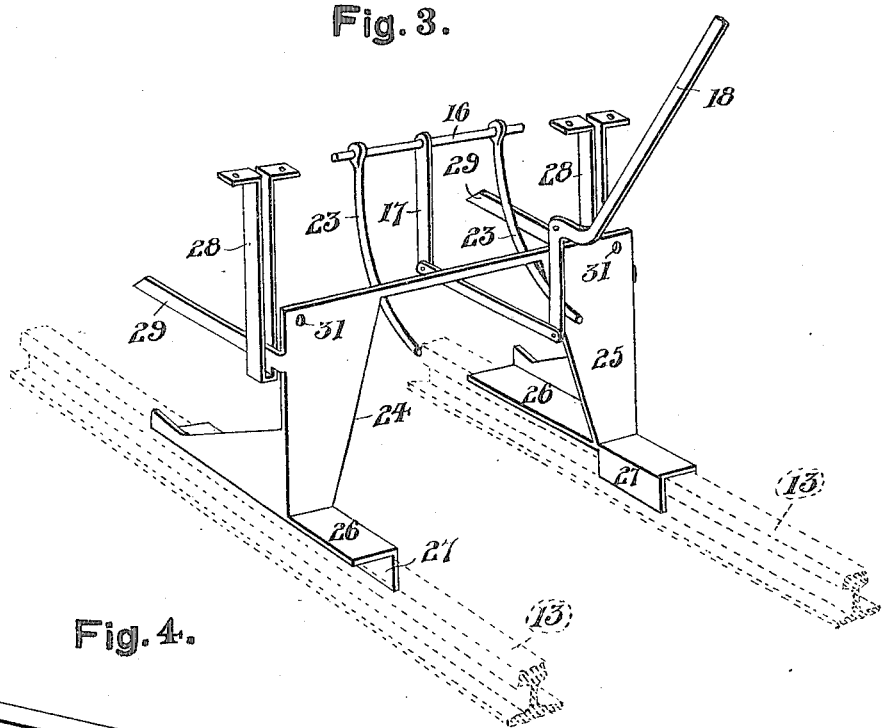
Figure 4:
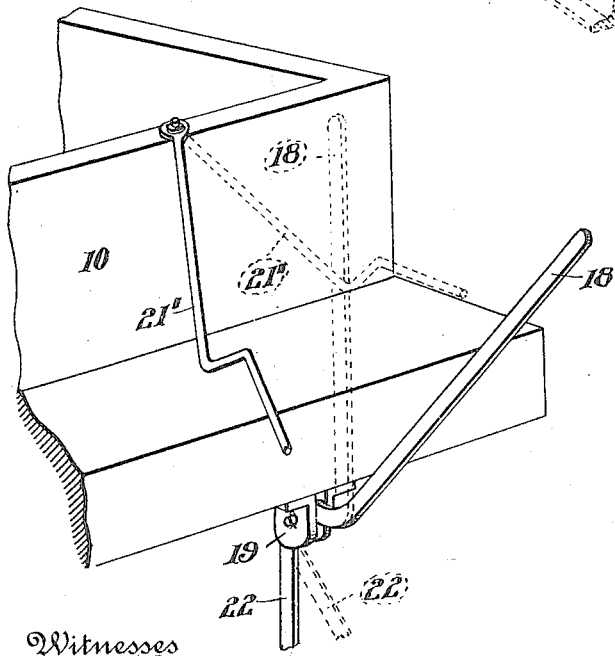

In the drawings forming a part of this application and in which like designating characters refer to corresponding parts throughout the several views: Figure 1 is a side elevation of the end portion of a car provided with the present invention and positioned in its elevated inoperative manner. Fig. 2 is a similar view with the device lowered in its operative position. Fig. 3 is a perspective view of the device detached and in its lowered operative position, with the rails shown in dotted lines and the operating lever broken away, and Fig. 4 is a perspective view of a corner portion of the car body showing the brake lever and keeper mounted thereon, the lever being broken away.

Referring more in detail to the drawings, the car 10 is illustrated as provided with a truck 11 under its end portion and having the outer or end pair of wheels 12, the car being positioned for traveling upon the track rails 13.

It will be understood that each end of the car is of identical formation and that the present device is preferably provided at each end thereof so as to provide brake shoes for the forward wheels of the car in whichever direction the car may be traveling.

The car frame 14 is provided with opposite brackets 15 upon its under side within which brackets a rod 16 is journaled transversely beneath the car. An arm 17 is rigidly secured at its upper end to said rod and extends downwardly therefrom. A brake operating lever 18 is pivoted to the clip 19 carried by the car frame and the free end 20 of said lever is adapted to be grasped by the brakeman upon the car, while a keeper or hook 21' pivoted to the car is adapted to engage over the lever 18 for retaining the brake inoperative. A link 21 connects the lower end 22 of the lever 18 and the arm 17 and as will be evident, a movement of the lever results in a partial rotation of the rod 16.

Spaced apart curved forwardly projecting supports or bars 23 are rigidly secured to the rod 16 and extend within the cut away portion 24 of an arch-shaped brake frame 25. The opposite lower ends of the frame 25 are provided with flat shoe plates 26 positioned perpendicularly to the frame 25 and adapted to flatly rest upon the rails 13 as best seen in Fig. 3. Angular downwardly extending flanges 27 are carried by the plates 26 at their inner edges, which flanges are adapted to engage the inner faces of the rails. Opposite U-shaped brackets 28 depend below the opposite outer edges of the car frame 14, each being adapted to receive a rearwardly projecting arm 29 of the frame for guiding the frame in its movements. Chains 30 are secured to the frame 14 and are connected to the upper edge of the brake frame 25 by having their lower ends positioned in the top perforations 31 of said brake frame.

With the mechanism positioned as illustrated in Fig. 1, the brake shoes 26 are elevated above the track by reason of the suspension of the brake frame 25 upon the arms 23, which arms are maintained elevated by the engagement of the hook 21' with the brake lever 18. Upon releasing the hook 21' from said brake lever, the frame 25 turns the rod 16 a partial rotation by reason of the weight of said frame, which latter descends to its operative position upon the rails 13 in advance of the wheels 12. The wheels 12 then travel upon the shoe plates 26 and engage the frame 25, and in this position the flanges 27 are positioned inwardly of the rails. It will thus be seen by merely releasing the hook 21' that the brake shoes are instantly positioned for use. When desired to elevate the brake shoes, the forward wheels are backed off of the plates 26 and a rearward movement imparted to the lever 18 which turns the rod 16 and raises the supports 23 together with the frame 25 and the hook 21' then being positioned to engage the lever 18, the brake mechanism is retained inoperative.

While the forms of the invention herein shown and described are what are believed to be preferable embodiments thereof, it is nevertheless to be understood that minor changes may be made in the form, proportion and details of construction without departing from the spirit and scope of the invention as set forth in the appended claims.

What I claim is:—

1. A device of the class described comprising in combination with a car, forwardly projecting curved support bars mounted therebeneath, means for elevating and lowering said bars, an arch-shaped brake frame freely mounted upon said bars and adapted for sliding movement thereon during an actuation of said bars, and shoe plates secured perpendicularly upon the lower ends of said frame.

2. A brake mechanism comprising in combination with a car frame mounted upon traction wheels, oppositely positioned brackets, a transversely positioned rod journaled in said brackets, an arm perpendicularly secured to the rod, means for partially revolving said rod, forwardly projecting curved support rods secured to said transverse rod, an arch-shaped brake frame freely mounted upon said support rods, a flexible connection between said brake frame and car frame, oppositely positioned U-shaped brackets depending from the outer edges of the car frame, rearwardly projecting arms upon said brake frame guidingly positioned within said U-shaped brackets, shoe plates having inner depending flanges carried by the lower ends of said brake frame and adapted for seating upon the rails of a track when the forward car wheels are positioned upon said plates with the device in its operative position.

In testimony whereof I affix my signature in presence of two witnesses.

MAREK BENKOVICS.

Witnesses:
LORENC VALACHOVIC,
MICHAEL GUTT.

Copies of this patent may be obtained for five cents each, by addressing the "Commissioner of Patents, Washington, D. C."